United States Patent [19]

Schuster et al.

[11] 4,344,281

[45] Aug. 17, 1982

[54] MANUALLY OPERATED METERING VALVE FOR A FUEL CONTROL

[75] Inventors: Robert W. Schuster; Gerald C. Mittendorf, both of South Bend, Ind.

[73] Assignee: The Bendix Corporation, Southfield, Mich.

[21] Appl. No.: 137,659

[22] Filed: Apr. 7, 1980

[51] Int. Cl.³ .................................................. F02C 9/08
[52] U.S. Cl. .................................................. 60/39.28 R
[58] Field of Search .................................... 60/39.28 R

[56] References Cited

U.S. PATENT DOCUMENTS

| | | | |
|---|---|---|---|
| 4,033,112 | 7/1977 | Schuster | 60/39.28 R |
| 4,077,203 | 3/1978 | Burnell | 60/39.28 R |
| 4,145,876 | 3/1979 | Stearns | 60/39.28 R |

*Primary Examiner*—Robert E. Garrett
*Attorney, Agent, or Firm*—Leo H. McCormick, Jr.; Ken C. Decker

[57] ABSTRACT

A fuel control having an electrically operated metering valve and a manually operated metering valve through which fuel is independently scheduled to an engine. During normal operation, the electrically operated metering valve controls the flow of fuel to the engine in response to an operator input signal. However, should an electrical failure occur, the manually operated metering valve is activated to schedule fuel to the engine. The manually operated metering valve has a pressure responsive member that receives an input signal representative of the discharge pressure of a compressor in the engine to prevent surging during acceleration.

14 Claims, 3 Drawing Figures

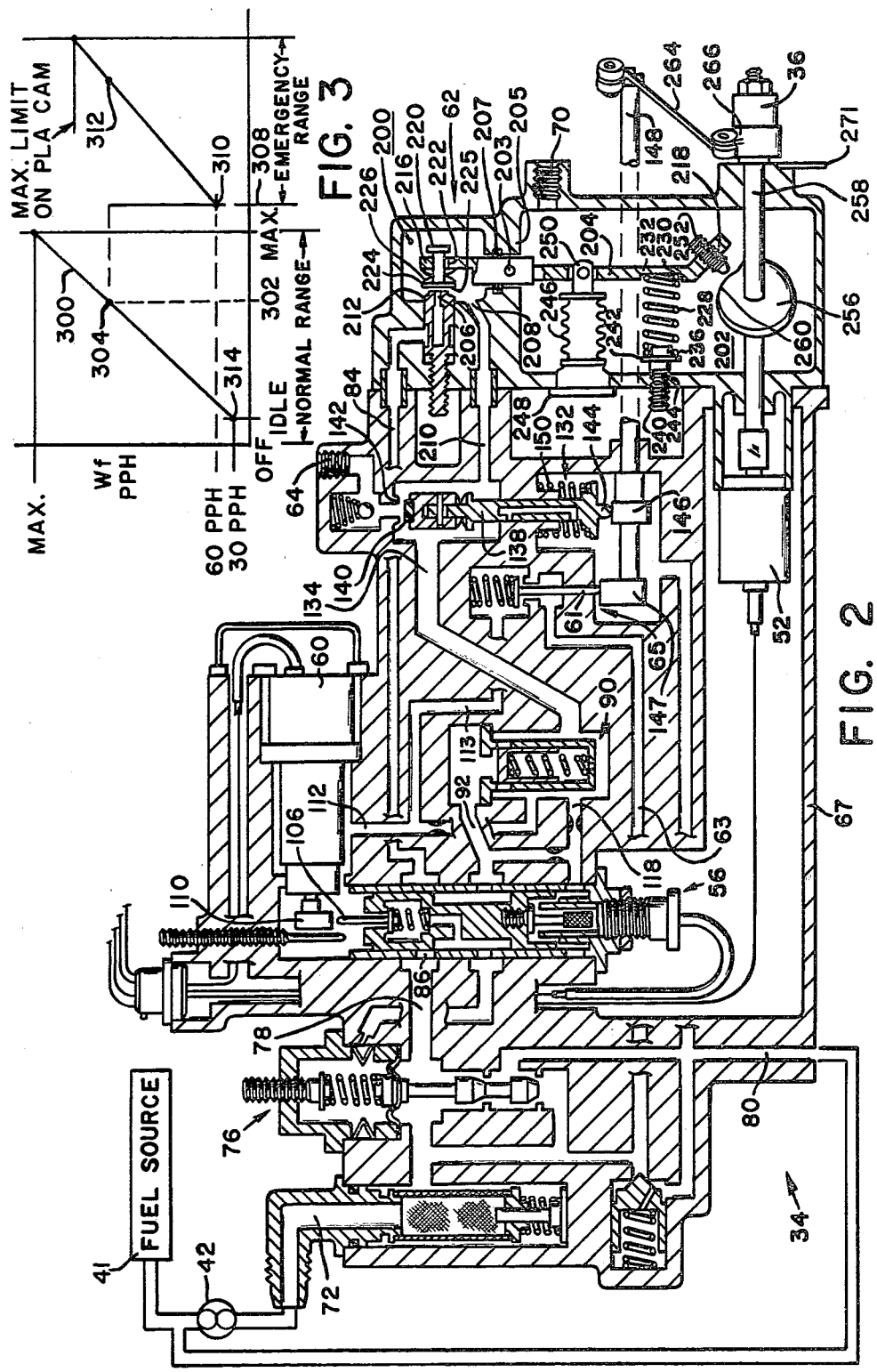

MANUALLY OPERATED METERING VALVE FOR A FUEL CONTROL

BACKGROUND OF THE INVENTION

This invention relates to a backup metering valve through which the flow of fuel to an aircraft engine is scheduled as a function of an operator input and the discharge pressure produced by a compressor in the engine.

In a known fuel control system disclosed in U.S. Pat. No. 4,033,112, a backup metering valve responds to a manual input for supplying fuel to an engine in the event that a malfunction occurs in the primary metering valve. During manual operation, surging of the engine could occur which would cause the compressor of the engine in the aircraft to stall if the rate of fuel flow increases too rapidly.

It is well known that as the speed of a compressor increases, the weight flow of air through the compressor must also increase. However, there is a limit to the rate at which airflow can be increased. The compressor which pumps air by means of blades, is dependent on smooth aerodynamic airflow in order to function properly. If the rotational speed of the compressor is accelerated faster than the airflow can accelerate, the smooth airflow required is interrupted and turbulence occurs. This turbulence reduces the airflow to the combustion chamber resulting in too great a volume of fuel in the combustion chamber. Thus, the fuel flow to the engine and the airflow must be matched with each other in order for the engine to operate effectively in meeting an input request of an operator.

SUMMARY OF THE INVENTION

In the present invention it was discovered that the operation of a manually operated backup valve could be modified by a compressor pressure signal and thereby match the fuel flow with the airflow during acceleration to prevent surging.

In more particular detail the backup metering valve has a lever with a first end located in a flow-through chamber connected to the source of fuel and the engine, and a second end, located in a control chamber connected to the compressor of the engine. A spring in the control chamber acts on the lever to urge the first end toward an orifice through which fuel is communicated to the flow-through chamber. A pressure responsive bellows attached to the lever and located in the control is responsive to the output pressure of the compressor for opposing the force of the spring to correspondingly allow fuel to flow through the orifice as a function of the output pressure of the compressor. A shaft connected to the power lever has a cam surface with a first section that engages the second end of the lever. During the operation of the primary metering valve, the first section of the cam surface engages the second end to hold the first end against the housing and prevent the flow of fuel through the orifice into the flow-through chamber. If a malfunction should occur in the primary metering valve, rotation of the cam by the power lever locates a second section of the cam surface adjacent the second end. The output pressure of the compressor acts on the bellows to provide a force that overcomes the spring and moves the lever to allow fuel to flow through the orifice as a function of output compressor pressure. When the fuel flow to the engine matches the flow corresponding to the power lever input position, the second end of the lever engages the second section of the cam surface to thereafter provide for substantially steady state flow.

It is an advantageous effect of this invention to provide a fuel control for an aircraft engine with a backup metering valve that prevents surging during manual operation of the backup metering valve.

It is an object of this invention to provide a backup metering valve with an operational feedback signal from an engine in order to match the rate of fuel flow with engine airflow in response to an operator input signal.

It is a further object of this invention to provide a fuel control having a primary electronic metering valve and a backup manual metering valve with a power lever arrangement having a cam surface with a first section that engages a lever to hold a face against a seat surrounding an orifice to prevent the flow of fuel through a bypass chamber during the operation of the electronic metering valve and a second section that engages the lever to permit the face to move away from the seat and allow fuel to be scheduled to the engine as a function of the output pressure created by the engine in response to manual operation of the backup metering valve.

These and other objects should be apparent from reading this specification and viewing the drawing.

BRIEF DESCRIPTION OF THE DRAWINGS

FIG. 2 is a schematic illustration of the fuel control of FIG. 1 with the backup metering valve in operation; and FIG. 3 is a graph showing the fuel flow associated with the position of the power lever.

DETAILED DESCRIPTION OF THE INVENTION

Figure 1:
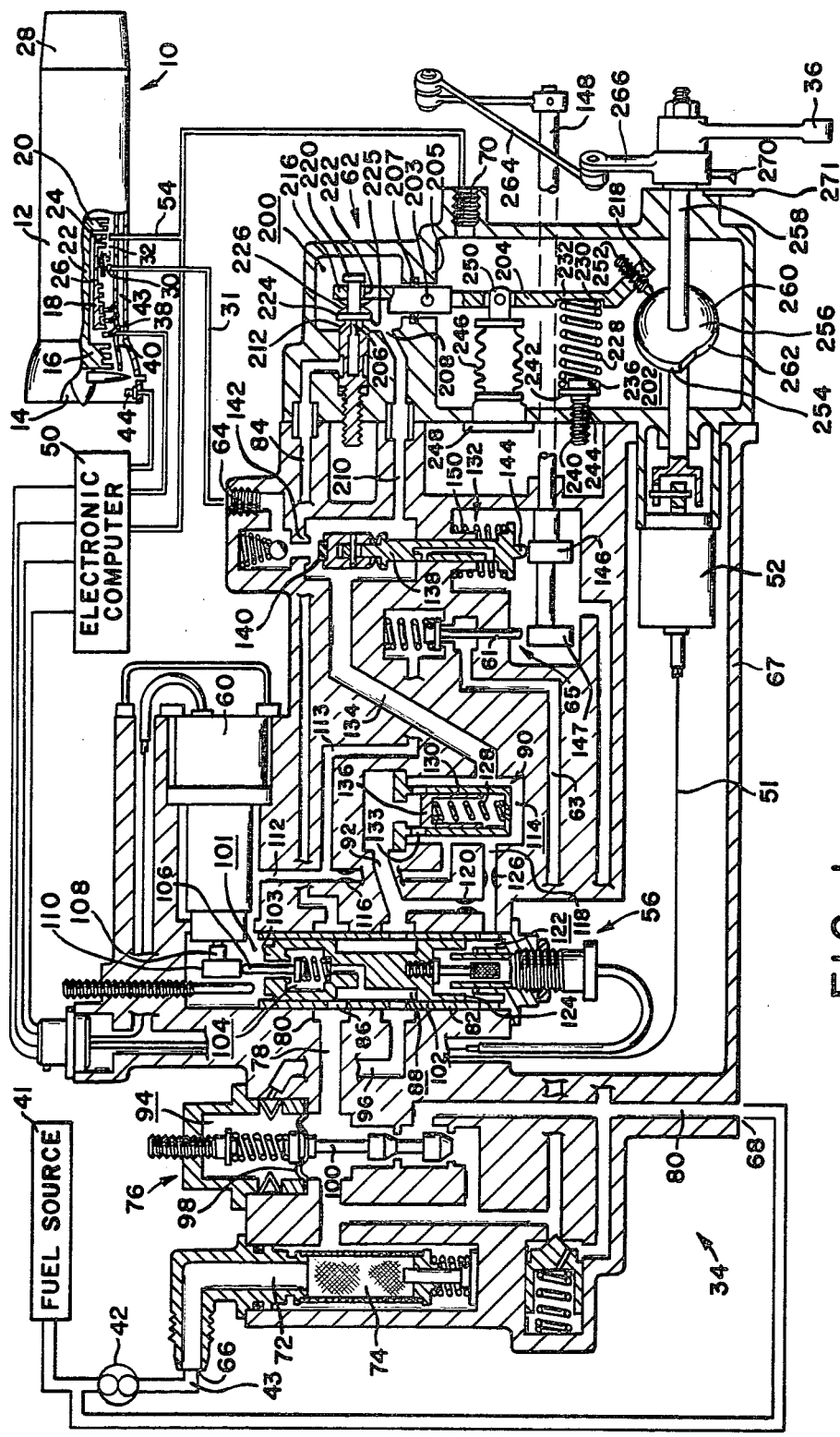
FIG. 1 is a schematic illustration of a turbine engine having a sectional view of a fuel control having a backup metering valve made according to the principles of this invention.

The turbine engine 10 for use in an aircraft as shown in FIG. 1 has a housing 12 with an air inlet 14, a first stage air compressor 16, a second stage air compressor 18, a first turbine 20 connected by shaft 22 to the first stage compressor 16, a second turbine 24 connected by shaft 26 to the second stage compressor 18 and an exhaust nozzle 28. A plurality of fuel nozzles 30 which are located in a combustion chamber 32 receive fuel from a fuel control mechanism 34 in response to an operator input to a lower lever 36. The fuel in chamber 32 and the air supplied thereto by the first and second stage air compressors 16 and 18 is combined as a fuel-air mixture and burned to generate a thrust as the products of combustion pass through exhaust nozzle 28.

The volume of air which is communicated to combustion chamber 32 is determined by the position of vanes 38 with respect to second stage compressor 18 to create a variable geometry flow path between shroud 40 and the second stage compressor 18 with any excess air being communicated to the rear of housing 12 through flow ducts 43.

The fuel supplied to nozzle 30 is metered flow from a positive displacement pump 42 that is driven by the output of the turbine 20 in a manner well known in the field of turbine engines.

The fuel-to-air ratio determines the temperature of the hot gases entering the turbine from combustion chamber 32. If the fuel flow through nozzles 30 is increased, the temperature of the air passing through combustion chamber 32 is proportionally increased to supply added thermal and pneumatic energy to rotate turbines 20 and 24 while at the same time increasing the thrust of the exhausted gases through nozzle 28.

In order to obtain optimum thermal efficiency and maximum thrust, the turbine inlet temperature is maintained as close to the allowable limits as possible. Thus, a temperature probe 44 is located in inlet 14 to monitor the temperature of the air that is supplied to the first and second stage compressors 16 and 18. The output of the temperature probe 44 is connected to an electronic sensing and computing member 50.

The electronic sensing and computing member 50 receives a first signal from transducer 52 representing the position of the power level 36, a second signal representing the compressor discharge pressure through conduit 54, a third signal representing the engine speed and other engine parameters in order to supply the primary metering valve 56 with an electrical operational signal. The electrical operational signal activates the metering valve 56 to schedule fuel to the engine in a manner fully described in U.S. Pat. No. 4,033,112.

To increase or accelerate the turbine speed or engine thrust, it is necessary to provide excess fuel flow above the amount required to run the engine at a fixed speed. However, the rate at which the engine speed can safely be increased is limited by the following engine operational factors: (a) the maximum allowable turbine inlet temperature; and (b) compressor stall. The electronic sensing and computing member 50 takes into account both inlet temperature and compressor pressure in providing the primary metering valve 56 with an operational signal.

If a malfunction should occur in the electronic system which would render the electronic sensing and computer member 50 inoperative, the requested fuel flow from the fuel control mechanism 34 would not respond to the power lever in the primary operational setting. However, a stepper motor 60 is designed to hold the metering valve 56 in a fixed position should such a failure occur. Thereafter, if an operator attempts to change the fuel flow requirement by use of the power lever 36, nothing happens until such time as the fuel control 34 is switched to the backup mode in which a backup metering valve 62 is manually operated.

The backup metering valve 62, while part of the fuel control 34, is independent of the primary or electrically operated metering valve 56. When the operator moves the power lever to the backup position, a transfer valve 65 is activated to provide a flow path for a first volume of fuel that is added to an idle volume of fuel that is always available from the metering valve 56 for distribution to the engine 10 through outlet port 64.

The backup metering valve 62 receives an operational signal corresponding to the pressure produced by the compressors 16 and 18 to proportionally schedule fuel to the engine during acceleration until the fuel flow is equal to that requested by the position of the power lever 36. Since the volume of fuel added by the backup metering valve 62 is substantially controlled by the output pressure of the compressors 16 and 18, surging of the engine is avoided and the operator should have sufficient control of the engine to thereafter maneuver an aircraft.

In more particular detail, the fuel control 34 is substantially identical in structure and operation as the fuel control disclosed in U.S. Pat. No. 4,033,112 with the exception of the stepping motor 60 and the backup metering valve 62. Therefore, only the structure of the stepping motor 60 and backup valve 62 shall be described in explicit detail.

The fuel control 34 has a housing 67 with an entrance port 66 connected to pump 42, a bypass port 68 connected to the fuel reservoir 41, and outlet port 64 connected by conduit 31 to nozzles 30 in the engine and a sensor port 70 connected to conduit 54 for receiving a pressure signal representative of the output pressure produced by the compressor 18 in the engine 10.

A supply conduit 72 connects the inlet port 66 with a filter 74 in housing 67. Clean fuel flows from filter 74 to a bypass valve 76. Depending on the fuel requirement, a first portion of the fuel received by the bypass valve flows to the metering valve 56 through passage 78 and a second portion or excess of the fuel is returned to the reservoir 41 through passage 80 by way of the bypass port 68.

The supply passage 78 is connected to a metering chamber 88 in metering valve 56 by an orifice 86 in sleeve 82. A groove 80 forms a flow path around the sleeve 82 to provide uninterrupted communication from supply passage 78 to passage 84 connected to the backup metering valve 62.

The metering chamber 88 is connected to a pressure differential valve 90 by passage 92 and to a control chamber 94 in the bypass valve 76 by a passage 96.

The difference in pressure between the fluid pressures in control chamber 94 and in supply conduit 78 act on a diaphragm 98 to position valve 100 and thereby control the volume of fuel returned to reservoir 41 through bypass passage 80.

A spool 102 in the electronic metering valve 56 has a passage 104 to connect the metering chamber 88 with a servo valve 106. The stepping motor 60 has a shaft 108 with a cam surface 110 on the end thereof. The cam 110 engages the servo valve 106 to establish fluid communication between the metering chamber 88 and distribution chamber 114 in the pressure differential valve 90 through passage 112. A restriction 116 in passage 112 causes a pressure drop in the fluid communicated to the distribution chamber 114.

Passage 92 is connected to chamber 114 by a passage 118. However, a first restriction 120 in passages 118 causes a first pressure drop in the fluid communicated from passage 92 to create a first control fluid. This first control fluid is communicated to chamber 122 where it acts on end 124 of spool 102 to oppose the force created by fluid in chamber 101 acting on end 103 of the spool 102.

A second restriction 126 is located in passage 118 between the first restriction 120 and the distribution chamber 114 to create a second pressure drop in the fluid communicated from passage 92. This second restriction prevents rapid fluid flow from chamber 122 which could cause oscillations of spool 102.

The combined force of the fluid which has experienced two pressure drops in conduit 118, the fluid which has experienced a single pressure drop in conduit 112 and the spring 128 act on piston 130 to oppose the movement of piston 130 by the force of the fluid in passage 92. When the force of the fluid in passage 92 is sufficient to move piston 130, orifice 133 is opened and fluid from passage 92 flows into distribution chamber 114.

Distribution chamber 114 is connected to cut off valve 132 by a passage 134.

Cutoff valve 132 has a body 138 with a first end 140 located in passage 134 adjacent seat 142 of outlet port 64 and a second end 144 which is urged toward a surface on cam 146 located on shaft 148 in the power lever assembly 36 by a spring 150. Once the power lever 36 is moved from the cutoff position, spring 150 holds body 138 in a fixed position as shown in FIG. 1.

The above-described components function to define the primary metering valve 56 for scheduling fuel to the engine 10 in response to an input to the power lever 36 by the operator and the output of the electronic sensor and computing member 50.

The remaining components in the fuel control 34 substantially make up the backup metering valve 62.

The metering valve 62 has a first chamber 200 and a second chamber 202 located in housing 67. Chamber 200 which is separated from chamber 202 by a wall 205 has a first orifice 206 connected to passage 84 and a second orifice 208 connected to outlet port 64 by passage 210. A valve seat 212 is located in orifice 206 to provide a controlled flow of fluid from passage 84 into chamber 200.

Sensor port 70 is located in the housing 67 to communicate a pressure signal corresponding to the output of the compressor into the second chamber 202.

A lever 204 has a first end 216 located in chamber 200 and a second end 218 located in the second chamber 202. A pin 203 fixes the lever 204 to the housing 67 and a seal 207 surrounds the lever 204 to prevent communication between chambers 200 and 202.

A stem 220 which is loosely located in an opening 222 in the first end 216 of the lever 204 has a head 224 with a face 225 positioned adjacent seat 212. A spring 226 located between the head 224 and the lever 204 urges the face 225 toward the seat 212.

A spring 228 located in chamber 202 has a first end 230 positioned in a groove 232 in the lever 204 and a second end 236 that engages a rib member 242 on bolt 240. Bolt 240 which extends through a threaded opening 244 in housing 67 can be adjusted to move rib 242 with respect to housing 65 and correspondingly cause lever 204 to pivot on pin 203 and move end 220 into engagement with spring 226 to bias face 225 on head 224 against seat 212 and seat passage 84 from chamber 200.

An evacuated bellows 246 located in chamber 202 has a first end 248 fixed to housing 67 and a second end 250 connected to lever 204. The pressure signal supplied to chamber 202 representing the output pressure of the compressors 16 and 18 acts on bellows 246 to provide a force that opposes the force of the spring 228 on the lever 204. However, during the operation of the primary metering valve 56 of the fuel control 34 adjustable projection 252 on the second end 218 of lever 204 engages the first section 254 of a cam 256 to hold the lever 204 in a substantially fixed position.

Cam 256 is located on shaft 258 which connects the power lever 36 with position transponder 52. In addition to the first section 254, cam 256 has a second section 260 representing the transfer of operation from the electronic operation to the manual operation. The second section 260 transitions into an apex or third section 262 which represents the maximum operational conditions that can be achieved by manual operation.

The power lever 36 which is attached to shaft 256 has a projection 266 attached to linkage 264 for connecting shaft 258 with shaft 148 and an indicator 270 for providing an operator with a visual indication of the position of shaft 258. The linkage 264 is designed to insure rotation of shaft 258 by power lever 36 is correspondingly transmitted to shaft 148 to open the cutoff valve 132 through the relationship of spring 150, body 138 and cam 146 and to actuate the transfer valve 62 on engagement of cam 147 with plunger 61.

MODE OF OPERATION OF THE INVENTION

In order to initiate starting of the turbine engine 10 shown in FIG. 1, the power lever is moved from the off to the idle position, as shown by the position of indicator 270 over dial 271. In moving the power lever 36 to the idle position, shaft 258 rotates to provide transponder 52 with an input signal that is transmitted into the electronic sensing and computing member 50 through lead 51. At the same time, shaft 148 is rotated by the movement of linkage 264 to allow spring 150 to move end 144 toward cam 146 and open the cutoff valve 132.

The electronic sensing and computing member 50 provides stepping motor 60 and the primary metering valve 56 with an electrical signal corresponding to the fuel flow requirement to start the engine 10.

The positive displacement pump 42, flows fuel from source 41 into supply conduit 43 for distribution from the fuel control 34 to nozzle 30 in combustion chamber 32. As fully disclosed in U.S. Pat. No. 4,033,112 the electronic sensing and computing member 50 controls the operation of the metering valve 56 to schedule fuel to nozzles 30 in response to an operator input applied to the power lever 36.

As shown in FIG. 3, fuel is supplied to operate engine 10 in a manner exemplified by curve 300. As long as electrical energy is available, the electronic sensing and computing member 50 controls the volume of fuel supplied to the engine in response to an input applied to the power lever 36.

If an electrical power failure or malfunction should occur, the fuel flow requirement corresponding to the power lever 36 position such as point 302 in FIG. 3, fuel continues to flow to the engine at a fixed rate intersected by dashed line 304 even though the power lever 36 is thereafter moved since stepping motor 60 is designed to remain in a stationary position. Even though the engine 10 continues to operate after an operational malfunction, the operator would not have sufficient control over the engine 10 to meet all the requirements to maneuver the aircraft without endangering the aircraft. Thus, the operator rotates the power lever 36 to the manual mode of operation as shown by the relationship of the components in the fuel control 34 in FIG. 2. On rotation of the power lever 36 to the manual position, cam 256 rotates to position the second section 260 adjacent projection 252 on lever 204. Depending on the compressor output, bellows 246 exerts a force on lever 204. For illustration purposes, assume the power lever 36 is moved to a minimum fuel flow requirement shown by point 308 in FIG. 3. Under this condition, the force of bellows 246 is insufficient to overcome spring 228 and flow through chamber 200 does not take place. However, a minimum operational flow of fuel to the engine 10 does take place in the following manner.

When the power lever 36 is moved to the manual position 308, linkage 264 moves shaft 148 such that cam 147 engages plunger 61 and provides for direct flow of fuel from the supply conduit 78 through conduit 63 to the transfer valve 65.

Fuel flows through the transfer valve 65 into passage 113 for distribution to the outlet port 64 by way of conduit 112 and 134.

The fuel in conduit 113 flows into chamber 101 and acts on end 103 of body 102 to move the primary electronic metering valve 56 to a position corresponding where minimum flow point 314 (idle flow) in FIG. 3, occurs through orifice 86 as shown in FIG. 2. This fuel flows in passage 92 to the pressure responsive valve 90 and through conduit 118 into chamber 114 for distribution to nozzle 30 from outlet port 64.

As shown in FIG. 3, the minimum operational fuel flow in the normal operation could be established at point 310. From the above analysis, it should be evident that the minimum operational fuel flow during manual operation is the combined fuel required to start or idle an engine 10 that flows through the closed metering valve 56 plus the fuel that flows through the transfer valve 62.

Should the operator desire to accelerate the engine from the speed associated with initial manual operational position 310, the power lever 36 is moved to the desired position. Normally, during such rotation, the second section 260 of cam 256 is out of engagement with projection 252 as shown in FIG. 2. As the compressor pressure increases, bellows 246 exerts a force on lever 204 sufficient to overcome spring 228 and move lever 204 about pivot pin 203 to permit fuel to flow from passage 84 into chamber 200 for distribution to outlet port 64 through passage 210. The rate at which fuel can be supplied to engine 10, is dependent on the output pressure produced by compressors 16 and 18 as received by bellows 246. Thus, the volume of fuel supplied to nozzles 30 for combustion in chamber 32 should not exceed the capacity of the turbine 10 supplying air to chamber 32 and as such "stalls" or stalling of the engine should be substantially eliminated.

We claim:

1. In a fuel control having an operational metering valve through which fuel is scheduled from a source to an engine in response to an electrical input signal and a transfer valve activated by an operator during a back-up operational condition in the absence of said electrical input signal to manually schedule fuel to the engine, the improvement comprising:
   a back-up metering valve having a housing with a first chamber and a second chamber therein, said first chamber having a first port connected to said source of fuel and a second port connected to said engine, said second chamber having a third port connected to said engine for receiving an operational signal corresponding to the discharge pressure of a compressor in the engine; and
   lever means responsive to said operational signal for limiting the flow of fuel through the first chamber to the engine as a function of compressor discharge to prevent surging during acceleration in response to a manually applied operational input.

2. In the fuel control as recited in claim 1, wherein said back-up metering valve further includes:
   a pin for attaching said lever means to the housing, said lever means pivoting on said pin in response to said operational signal to move a first end thereon in the first chamber with respect to said first port and thereby control the fuel flow therethrough.

3. In the fuel control, as recited in claim 2, wherein said back-up metering valve further includes:
   a shaft having a cam surface thereon, said cam surface having a first section corresponding to the operation of the engine during the scheduling of fuel in response to the electrical input signal, and a second section corresponding to a minimum fuel flow during backup operational conditions which transitions into a third section corresponding to a maximum fuel flow during backup operational conditions;
   a power lever connected to said shaft, said manually applied operational input being applied to the power lever for rotating said cam surface; and
   said lever means having a second end, said second end engaging said cam surface to hold the first end against the first port to prevent fluid communication through said first chamber during engagement with the first section and to proportionally allow fuel flow through the first port on engagement with the second section.

4. In the fuel control, as recited in claim 3, further including:
   pressure responsive means located in said second chamber for controlling the rate of movement of the second end of the lever means toward the second section; and
   resilient means located in said second chamber for opposing the movement of the lever means by the pressure responsive means to establish a direct relationship between the compressor discharge pressure and the fuel flow to the engine through the first chamber.

5. In the fuel control, as recited in claim 4, further including:
   adjustment means for positioning said resilient means within said second chamber to synchronize the opening of the first port through which fuel is communicated to the engine from the first chamber with changes in compressor discharge pressure represented by the operational signal in the second chamber.

6. In the fuel control, as recited in claim 5, further including:
   a stem connected to said first end of the lever means, said stem having a face thereon; and
   a spring connected to said stem for urging said face into engagement with the housing surrounding the first port, said spring minimizing the effect of movement of the lever means caused by the deviations in the first section of the cam surface to inhibit fuel flow through the first chamber in the presence of an electrical signal input and thereby assure that the operational characteristics of the engine are not modified by the inadvertent addition of fuel from the first chamber during the operation of the metering valve by the electrical input signal.

7. In the fuel control, as recited in claim 6, wherein said spring allows the stem to move independently of the lever means and thereby compensate for any dimensional changes in the fuel control from temperature changes in the fuel.

8. In the fuel control, as recited in claim 2, further including:
   a power lever system having a shaft with a cam surface thereon, said cam surface having a first section that engages the lever means to hold the first end of the lever against the housing surrounding the first port and prevent fuel flow through the first chamber during the activation of the operational metering valve by the electrical input signal, and a second section corresponding to an operational fuel-to-air relationship for operating the engine from a minimum fuel flow condition to a maximum fuel flow condition in response to a manual input.

9. In the fuel control, as recited in claim 8, further including:
a bellows located in said second chamber having a first end fixed to the housing and a second end connected to the lever means; and
resilient means having a first end fixed to the housing and a second end connected to the lever means, said manual input rotating siad shaft to position a second end of the lever means adjacent the second section on the cam surface, said resilient means urging said first end of the lever means toward the first port, said second chamber receiving a pressure signal corresponding to the discharge pressure of a compressor in the engine, said pressure signal acting on the bellows causing the bellows to collapse and exert a force on the lever means, said force overcoming the resilient means to allow the lever to pivot on the pin and permit fuel to uniformly flow through the first chamber for distribution to the engine at a flow rate corresponding to the manual input position without a surge condition being created.

10. In a fuel management system having a primary metering valve and a secondary metering valve connected to a source of fuel and responsive to movement of a power lever by an operator for supplying an engine with operational fuel, said secondary metering valve providing the engine with a backup operation should a malfunction occur in the operation of the primary metering valve, the improvement comprising:
linkage for connecting the power lever with the primary and secondary metering valves, said linkage having a cam member rotated by movement of the power lever, said cam member having a first section that engages the secondary metering valve to prevent fuel flow therethrough during operation of the primary metering valve and a second section that allows the secondary metering valve to move and supply the engine with fuel as a function of the engine compressor discharge pressure during the backup operation.

11. In the fuel management system, as recited in claim 10, wherein said secondary metering valve includes:
a housing having a bypass chamber separated from a control chamber by a wall, said housing having an entrance port through which fuel is supplied to the bypass chamber, an exit port through which fuel is supplied to the engine from the bypass chamber, and a control port through which discharge pressure from the engine compressor is supplied to the control chamber,
a lever pivotally connected to said wall and having a first end located in said bypass chamber and a second end located in the control chamber, said first section of the cam engaging said second end of the lever and moving said first end of the lever toward said entrance port to prevent fuel flow through the bypass chamber to the engine during the operation of the primary metering valve; and
bellow means located in said control chamber for limiting the movement of the second end of the lever toward the second section of the cam in response to changes in the compressor discharge pressure to control the rate of change of fuel flow to the engine during acceleration and thereby prevent surging during backup operation.

12. In a fuel control having an operational metering valve through which fuel is scheduled from a source to an engine in response to an input signal and a transfer valve activated by an operator during a back-up operational condition in the absence of said input signal to manually schedule fuel to the engine, the improvement comprising:
a back-up metering valve having a housing with a first chamber and a second chamber, said first chamber having a first port connected to said source of fuel and a second port connected to said engine, said second chamber having a third port connected to said engine for receiving an operational signal corresponding to the discharge pressure of a compressor in the engine; and
lever means responsive to said operational signal for limiting the flow of fuel through the first chamber to the engine as a function of compressor discharge pressure to prevent surging during acceleration in response to a manually applied operational input.

13. In the fuel control as recited in claim 12, further including:
pressure responsive means located in said second chamber for controlling the rate of movement of said lever; and
resilient means located in said second chamber for opposing the movement of the lever means by said pressure responsive means to establish a direct relationship between the compressor discharge pressure and the fuel flow to the engine through the first chamber.

14. In the fuel control as recited in claim 13, further including:
adjustment means for modifying said resilient means to synchronize the flow of fuel from the first chamber with the activation of said back-up metering valve.

* * * * *